Sept. 22, 1959 L. GALLIN 2,905,312
EYEGLASS CASE
Filed Sept. 5, 1958
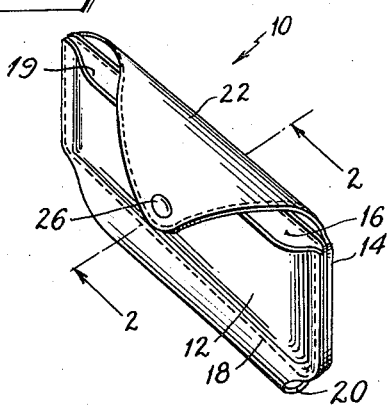
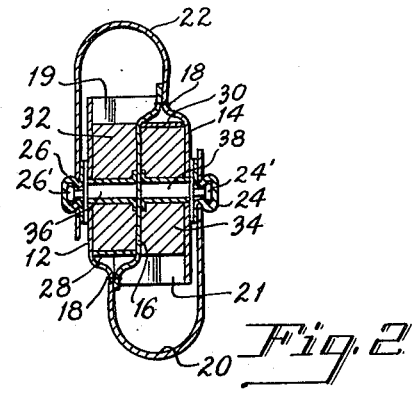
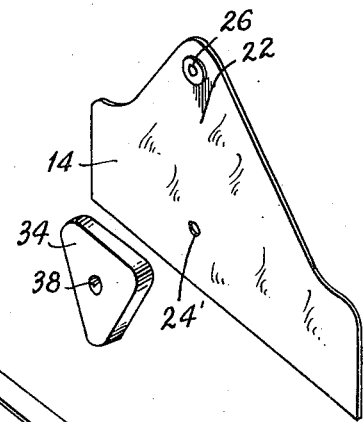
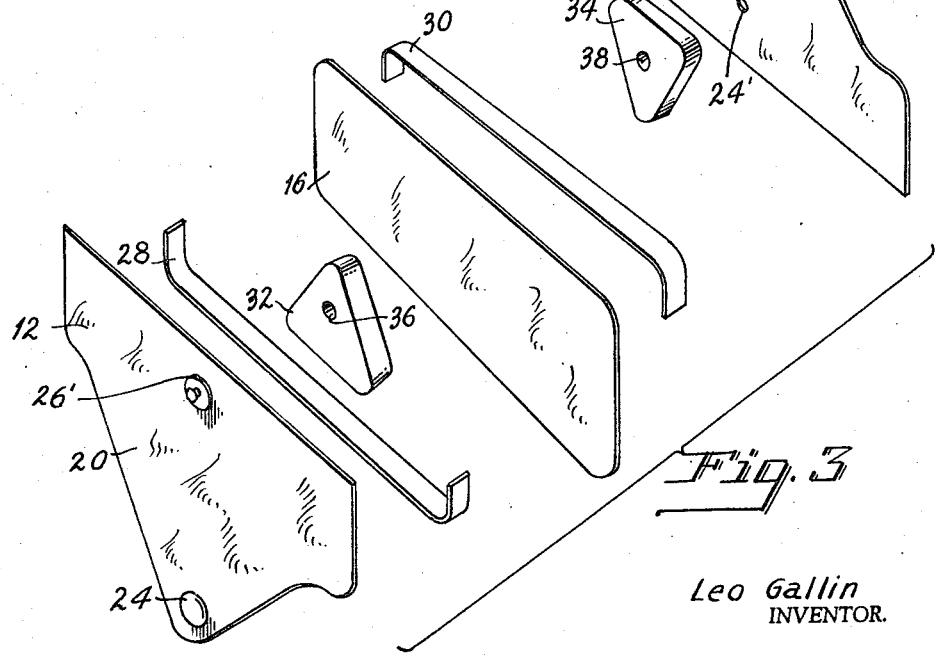
Leo Gallin
INVENTOR.
BY Howard Myles Schwinge
ATTORNEY

United States Patent Office 2,905,312
Patented Sept. 22, 1959

2,905,312

EYEGLASS CASE

Leo Gallin, Brooklyn, N.Y.

Application September 5, 1958, Serial No. 759,172

2 Claims. (Cl. 206—5)

This invention relates to eyeglass cases and more particularly, to dual compartment cases of such nature which accommodate two pairs of glasses.

Although dual compartment eyeglass cases have been heretofore proposed to meet the increasingly occurring need of the individual who is obliged to carry two pairs of eyeglasses on his person, these prior proposals have in one way or another been deficient and by reason thereof have failed to gain acceptance. Amongst the primary deficiencies of the prior devices were the bulk, cost of production, unsightliness and difficulty of withdrawing the glasses from the case.

It is therefore amongst the primary objects of the present invention to provide a new and improved double compartment eyeglass case which overcomes the deficiencies characteristic of the prior devices.

It is another important object of the present invention to provide a dual compartment eyeglass case which is simple and inexpensive to manufacture and requires a minimum of labor and materials.

It is still another object of the present invention to provide a dual compartment eyeglass case wherein two pairs of glasses may be confined in a minimum of space and still be readily and easily withdrawn from the case.

Briefly stated the double compartment eyeglass case of the present invention comprises an eyeglass case formed by two substantially similar members for enclosing and pocketing therebetween two pairs of eyeglasses, said members being marginally joined to a connecting member, said member being similar in size and shape to said enclosing members and positioned therebetween to divide the case into two compartments.

A fuller understanding of the invention and the manner in which its objectives and advantages may be realized will become apparent from the following detailed description thereof taken in connection with the accompanying drawing wherein:

Fig. 1 is a perspective view of a dual compartment eyeglass case made in accordance with the present invention;

Fig. 2 is a transverse sectional view taken on lines 2—2 of Fig. 1 in the direction of the arrows; and Fig. 3 is an exploded view showing the component parts making up the case of the preceding figures.

Referring now to the drawing, an embodiment of the eyeglass case of the present invention, designated generally by numeral 10, is shown consisting of two substantially similar members 12 and 14 marginally joined to a connecting member 16 as by stitching 18 to form a double compartment eyeglass case, the two compartments best seen in Fig. 2 being designated herein by numerals 19 and 21.

It is preferred that the dual compartment eyeglass case of the present invention be of a relatively pliant and workable composition such as leather, simulated leather, plastic or fabric which is both durable and pleasing to the eye and touch. In the case of plastic or other synthetic material, the union of enclosing members 12 and 14 to connecting member 16 may be effected by bonding or heat sealing rather than stitching, as shown in the drawing.

As is evident from the drawing, particularly Fig. 3 thereof, enclosing members 12 and 14 are each provided with extensions in the form of triangular flaps 20 and 22 which extend oppositely of each other. Snap means 24, 26' and 24', 26, respectively, are provided on said flaps for fastening the free end of a flap to the enclosing member from which the other flap extends.

It is characteristic of compacted eyeglass cases in accordance with the present invention that access to one compartment is opposite to that of the other compartment, as is seen in Fig. 2, and also, that the free end of one flap is designed to be fastened to the enclosing member from which the other flap extends.

Spacers 28, 30 respectively, are provided to space enclosing members 12 and 14 from connecting member 16, positioned therebetween. This allows for ready insertion and withdrawal of eyeglasses from each compartment. Members 32, 34 are provided to centrally support the glasses and to aid in the positioning of the glasses within the case. Rivets 36, 38 extending from snap members 24' and 26' hold members 32 and 34 rigidly in place.

In practice, when it is desired to place glasses within dual compartment case 10, flaps 20 and 22 are unsnapped from members 12 and 14 and unrolled so as to clear the openings to chambers 19 and 21. A pair of glasses is then positioned by its bridge over member 32 and flap 22 is then rolled over the glasses and snapped to enclosing member 12.

The case is then inverted and the process repeated with a second pair of glasses. It is to be noted that the glasses when confined within the dual compartment case are in inverted relationship, one to the other.

It may therefore be seen that by virtue of the present invention a dual compartment case has been provided which is an improvement on and overcomes the deficiencies characteristic of the prior devices, which is simple and inexpensive to manufacture and requires a minimum of labor and materials, and wherein two pairs of glasses may be confined in a minimum of space and still be readily and easily withdrawn from the case.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of my invention as defined by the appended claims, and by means of which, objects of my invention are attained and new results accomplished, as it is obvious that the particular embodiment herein shown and described is only one of the many that can be employed to attain these objects and accomplish these results.

What is claimed as new and desired to be secured by Letters Patent is:

1. A double compartment eyeglass case formed of two substantially similar body members of readily pliant composition for enclosing and pocketing therebetween two pairs of eyeglasses, a connecting member positioned between said body members, each of the body members comprising a substantially rectangular elongated base portion and a triangular tab portion extending from one long side thereof, said members being arranged with the rectangular base portions only overlapping and secured together at their ends with the triangular portions projecting in opposite directions, the connecting member being of the configuration of the rectangular base portions, said connecting member having one longitudinal edge connected to one body member along its rectangular edge portion adjacent its triangular tab and the opposite longitudinal edge connected to the other body member along its rectangular edge adjacent its triangular tab, whereby to form oppositely open pockets.

2. A double compartment eyeglass case formed of two substantially similar body members of readily pliant composition for enclosing and pocketing therebetween two pairs of eyeglasses, a connecting member positioned between said body members, each of the body members comprising a substantially rectangular elongated base portion and a triangular tab portion extending from one long side thereof, said members being arranged with the rectangular base portions only overlapping and secured together at their ends with the triangular portions projecting in opposite directions, the connecting member being of the configuration of the rectangular base portions, said connecting member having one longitudinal edge connected to one body member along its rectangular edge portion adjacent its triangular tab and the opposite longitudinal edge connected to the other body member along its rectangular edge adjacent its triangular tab, whereby to form oppositely open pockets, nose piece supporting members positioned in each pocket and secured to the outer face thereof, and snap fastener elements secured to each nose piece supporting member and cooperating with a corresponding snap fastener element carried by the flap portion of the adjacent body member.

References Cited in the file of this patent

UNITED STATES PATENTS

| D. 146,223 | Klanitz et al. | Jan. 14, 1947 |
| 1,682,719 | Aldrich | Aug. 28, 1928 |

FOREIGN PATENTS

| 484,086 | Great Britain | Apr. 27, 1938 |